United States Patent [19]

Koehler

[11] Patent Number: 4,887,906
[45] Date of Patent: Dec. 19, 1989

[54] COLOR MATCH PREDICTABILITY SYSTEM AND METHOD

[76] Inventor: Clarence Koehler, 62 Summit Dr., Denville, N.J. 07834

[21] Appl. No.: 179,769

[22] Filed: Apr. 11, 1988

[51] Int. Cl.⁴ .............................................. G01J 3/50
[52] U.S. Cl. .................................... 356/402; 356/421; 364/526
[58] Field of Search ........ 356/402, 416, 419, 421–425; 364/498, 526; 434/98, 101–104

[56] References Cited

U.S. PATENT DOCUMENTS

| | | | |
|---|---|---|---|
| 3,601,589 | 8/1971 | McCarty | 356/402 |
| 4,608,015 | 8/1986 | Smigel | 434/104 |
| 4,635,213 | 1/1987 | Murata et al. | 356/402 |

FOREIGN PATENT DOCUMENTS 2192455  1/1988  United Kingdom ............... 364/526

Primary Examiner—F. L. Evans
Attorney, Agent, or Firm—John G. Gilfillan, III; John N. Bain; Louis S. Gillow

[57] ABSTRACT

A color match predictability system having a color sample, a predictability guide with sections having varying degrees of halftones, a spectrophotometer, and a computer with input and output devices. A light is directed at the color sample and then passed into the spectrophotometer where its color spectrum is analyzed, converted into data, and fed to the computer. A colorant formulation is calculated by the computer for the original color sample and for a series of modified samples including different halftone sections superimposed on the original color sample. The quality of the color match for the various formulations is analyzed to determine the formulation having the best possible color match. The modified sample having the best color match may be viewed by the user to predict the color of the final product.

11 Claims, 1 Drawing Sheet

COLOR MATCH PREDICTABILITY SYSTEM AND METHOD

BACKGROUND OF THE INVENTION

The present invention relates to color matching and more particularly to color matching predictability methods and systems.

Those concerned with the development of colored products, such as paints, plastics, printing inks, textiles, and the like, have long recognized the need for improved methods of faithfully reproducing color at an economical cost and in shorter times. Increasingly, manufacturers concerned with the quality and cost of color have turned to computer color control systems, which couple the precision and reliability of a spectrophotometer with the power of a digital computer to provide capabilities of color measurement, formulation, and control.

When used for color matching, such computer systems perform the function of analyzing the color sample and calculating a best match in the form of output data listing a color formulation, i.e., a proportional combination of colorants, that may be used to prepare the desired color. Although such systems usually produce a reasonably close color match, they are not entirely satisfactory because the sample and the best computer-produced match are often significantly different. In many cases color duplication is impossible. For example in a printing process, inability to duplicate a color may be due to the printed substrate, lack of clean inks in the ink system used, color saturation of a swatch, etc.

More specifically, assume a color match between a color sample on one substrate, e.g. light yellow on bright white bond paper, is to be reproduced for application on a significantly different substrate, e.g. an aluminum can, using any combination of a given number of specific ink colorants. A typical color matching computer system will read the color sample and produce an output formulation as a listing of the specific proportional combination of the ink colorants. In order to accomplish this, stored in the computer will be a data base including colorant data related to the available colorants and substrate data related to standard substrates. A computer algorithm, using the input color sample data and the stored data base, will compute the resulting proportional combination of colorants. In the example where a sample of light yellow on bright white bond paper is to be color matched on an aluminum substrate, the computer output formulation might be 10% dark yellow, 5% bright yellow, 0.2% neutral black and 84.8% opaque white. Additionally, the computer output will also include an index number as a measure of the quality of the color match, i.e. an indication of the difference between the color sample and the color producible by the computer generated formulation.

In general, given only the index number, it would not be clear to a user, at least subjectively, just how much of a difference there would be between the color sample and the finished product. In order to clearly visualize the quality of a match, a particular combination of computer output colorants must be physically mixed and applied to the particular substrate involved. As such, users are often forced to resort to complex color proving procedures, wherein actual substrates and color mixtures are prepared in search of an acceptable match. In many other cases, the value of the index number will fall outside an acceptable range, thereby rendering the corresponding formulation of no value even as a starting point in a color proving procedure.

Reducing the time involved in trial and error formulating and manual preparation of physical samples has been one of the most critical problems confronting developers of color matching systems. Consequently, those concerned with the development of color matching systems have recognized the need for a color match system that will significantly reduce costs by providing a system capable of producing information significantly more meaningful than an abstract index number, but less time consuming to perform than conventional manual color proving procedures. The present invention fulfills this need.

SUMMARY OF THE INVENTION

The general purpose of this invention is to provide a method and system wherein the duplication level of a color is made available for visual presentation without performing manual color proving. To attain this, the present invention contemplates a means for quickly producing alternate computer-generated formulations that have improved quality color matches and are readily viewable by a user in the form of a modified color sample. In the present method and system, the original color sample and a color predictability guide are used in combination with conventional computer color matching systems to make available a visual interpretation of the best producible color match. This information is available at the computer system, thereby eliminating considerable lost time in reformulating in vain actual color matches in search of an unobtainable color.

More specifically, the present invention includes a system wherein a color sample is analyzed to determine its spectrum. Based on that spectrum, a color formulation and a quality index number related thereto are generated. The color sample is then modified in a predetermined manner. The modification is designed to simulate the type of deviation that the computer generated color will have with respect to the original color sample. The modified sample is then analyzed, as was the original sample, to determine its spectrum. A new formulation and quality index number are then generated. This process is performed repeatedly, modifying the original color sample a different amount for each cycle until the highest quality color match is obtained. The modified sample having the best or optimum quality match may now be visually compared to the original sample. The visual comparison affords the user a prediction of the best color duplication level obtainable with the available colorants and substrates.

It is, therefor, an object of the present invention to provide a computerized color matching system for producing a visual interpretation and a formulation of a predicted color that is substantially the closest possible color match.

Another object is the provision of a method for finding and producing a formulation and a corresponding visual indication of the best color match producible by a color matching computer system.

Other objects and many of the attendant advantages of this invention will be readily appreciated as the same becomes better understood by reference to the following detailed descriptions when considered in connection with the accompanying drawings wherein:

DETAILED DESCRIPTION OF THE PREFERRED EMBODIMENT

Figure 1:
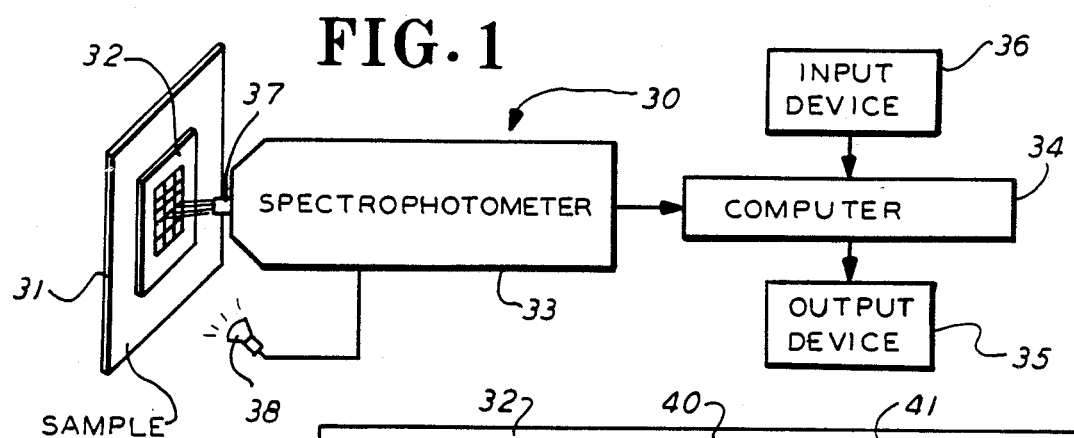
FIG. 1 is a schematic diagram of the preferred embodiment of the invention.

FIG. 1, which illustrates a preferred embodiment of the color match predictability system 30, shows a color sample 31, a predictability guide 32, a spectrophotometer 33 or other color measuring device, a computer 34, an input device 36, and an output device 35. The spectrophotometer 33 has an input element 37 and an output line connected to computer 34. Spectrophotometer 33 may be any available color instrument that measures the transmission or apparent reflectance of visible light as a function of wave length from a color sample such as sample 31. In the case where the apparent reflectance of sample 31 is measured, a light source 38, under the control of spectrophotometer 33, is positioned to reflect light off of the color sample 31 and into the input element 37. If the color sample 31 is partially transparent and it is desired to match its color transmission, then the light source 38 would be placed on the opposite side of sample 31 so that light from source 38 will pass through sample 31 into input element 37.

The output of spectrophotometer 33 may be a series of standard digital output signals. These digital signals will relate the amount of measured light energy associated with a plurality of wave lengths for light entering element 37 across the visible spectrum from ultraviolet to blue, to green, yellow, red, etc. The digital signals are inputted to a computer 34 having conventional software for generating a color formulation based on the desired substrate and available colorant data inputted to computer 34 via input device 36.

The output of computer 34 will normally include a formulation and an index number indicative of the quality of the color match level. For example, as described above for a sample of light yellow on bright white bond paper, the computer output may have the following output:

|  |  |
| --- | --- |
| 10% | Dark yellow |
| 5% | Bright yellow |
| 0.2% | Neutral black |
| 84.8% | Opaque white |
| 9.6 | Index number |

The formulation and index number would be provided at the output device 35, which typically may be a printer or a CRT. The input device 36 can be a keyboard, a disk drive, or the like. Computer systems, index numbers, and commercially available standardized colors and colorants are all well known to those skilled in the art. The above noted index number may be a Metamerism Index, or CieLab, FMC II, or Hunter color difference units, all of which are well known. Such index numbers are routinely provided as outputs on many of the conventional systems, e.g., ACS system of the Applied Color Systems, Inc., Princeton, New Jersey.

The value 9.6, listed above as an example, for a particular index number would have meaning for only the most skilled users of a given system. However, for only frequent system users, such as customers, the value of an index number will have only slight relevance and little or no subjective value. In many cases the best quality match, as represented by the index number, is unacceptable and no formulation is possible.

Figure 2:
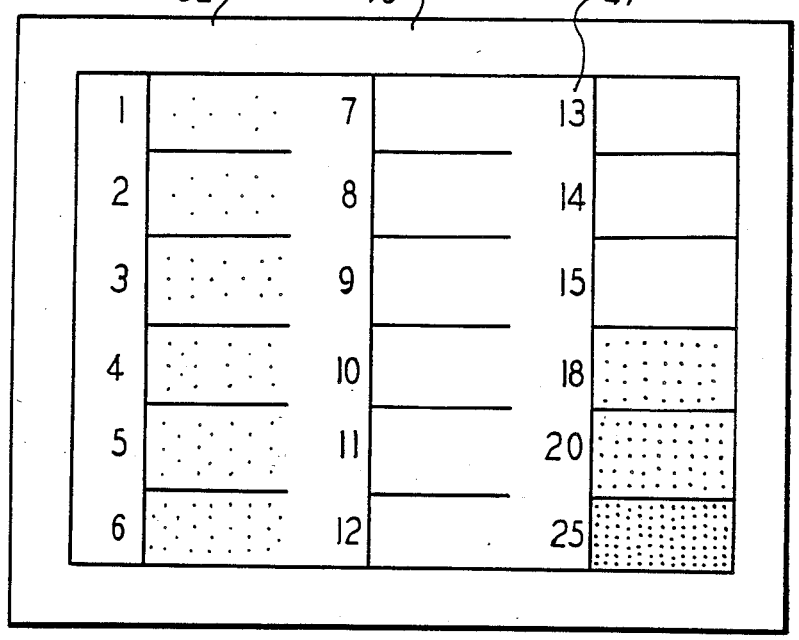
FIG. 2 is a plan view of a portion of the device shown in FIG. 1.

As described above, in conventional systems the quality of a color match is typically improved by trial and error formulating and actual color proving techniques. To avoid such costly processes, contemplated in the present invention is the use of a predictability guide 32. Guide 32 includes a rigid frame 40 and a transparent sheet 41 having imprinted thereon a plurality of halftone sections, numbered 1 through 25. The halftones are shown in FIG. 2 in schematic fashion using spaced dots. In reality each section 1–25 would consist of numerous, very fine dots barely distinguishable to the naked eye. The halftone sections 1–25 have different degrees of tones varying consecutively from the lightest tone in section 1 to the darkest tone in section 25. For example, section 1 may contain a 1% halftone, section 2 may contain a 2% halftone, etc. As shown in FIG. 1, the guide 32 is placed over the sample 31 between the input device 37 and sample 31. In the present method and system, successive readings are made of the sample 31 and guide 32 for a series of different halftone sections 1–25. The readings are made by spectrophotometer 33 and outputted by computer 34. The readings each produce a different formulation and an associated index number.

It is pointed out here that in many computer systems each computer reading produces more than one formulation. The different formulations for a single reading are the result of various restrictions, such as the least expensive formulation, the formulation for the least number of colorants, etc. Also, for each formulation, several different index numbers may also be outputted by the computer 34. Each index number may correspond to a different color differnce unit (e.g. CieLab, metamerism, FMC II, Hunter) and be generated with a different algorithm. The present invention will work equally well with all of the different formulations using one or more of the index numbers.

The index numbers for the successive readings using different halftone sections 1–25 may now be analyzed by the computer 34 or user to determine which of the successive readings gives the lowest index number. Using the halftone sections 1–25 in combination with the color sample 31, the operator is in effect modifying the sample 31 in a manner that simulates the most significant element affecting the quality of the color match. While other types of modifications are clearly possible, the present invention contemplates the use of halftone sections because, in many cases, color matches are most difficult to accomplish due to the presence of unwanted black or gray tones. A user will use guide 32 with sample 31 to analyze and view a number of modified color samples, most producing different but better quality index numbers than the numbers produced for the original sample 31. As such, the modified color sample that produces the best or optimum index number may be quickly determined and readily viewed to see the difference between the optimum color match that the color matching system will produce and the desired color on sample 31.

Figure 3:
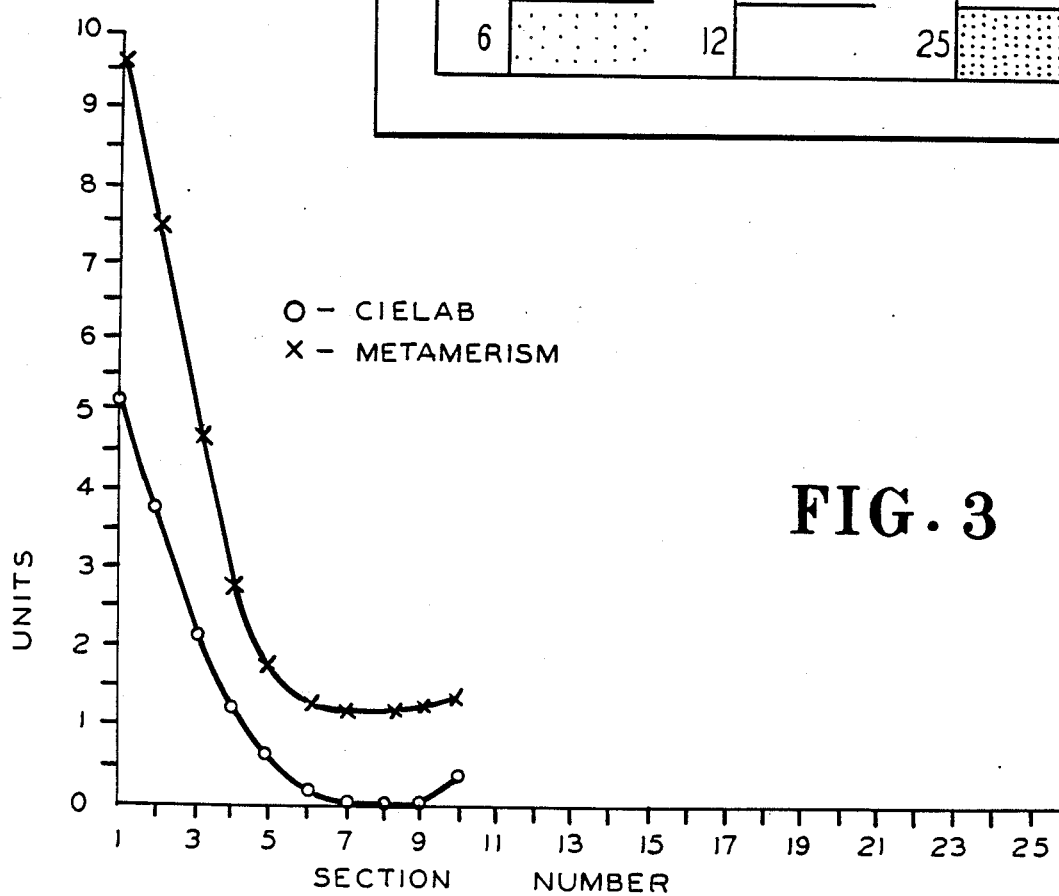
FIG. 3 is a two dimensional graph useful in understanding the preferred embodiment.

FIG. 3 is a plot of a typical set of index numbers for various halftone sections 1–25. The following chart is a listing of the plotted data in FIG. 3 and represents a typical set of results for a color sample that produced no match within 10 CieLab color difference units:

| Numeric Match Level (Sections 1-25) | CieLab | Metamerism Index |
|---|---|---|
| 1 | 5.1 | 9.6 |
| 2 | 3.8 | 7.5 |
| 3 | 2.1 | 4.7 |
| 4 | 1.2 | 2.7 |
| 5 | 0.6 | 1.8 |
| 6 | 0.1 | 1.2 |
| 7 | 0.0 | 1.1 |
| 8 | 0.0 | 1.1 |
| 9 | 0.0 | 1.2 |
| 10 | 0.3 | 1.3 |
| 11-25 | No reading. | |

As clearly indicated by this data (FIG. 3), the optimum match level (minimum index number) for the original color sample 31 occurs for the modified color sample using the original color sample 31 and halftone section 7 superimposed thereon. The user may now view the modified sample for visual comparison to the original sample 31 and to predict the color of the final product. A pre-informed customer, if pleased with the predicted color as shown by the modified color sample, could now approve the color proving with a reasonable expectation as to what the color of the final product will actually look like. In contrast, an uninformed customer or user often enters the color proving or a production run with unrealistic expectations for the final color, thereby causing dissatisfaction and additional expense.

Obviously, many modifications and variations of the present invention are possibly in the light of the above teachings. For example, readings are made by manually placing the sample 31 at different locations on the guide 32. However, other modifications are possible and will be evident to those skilled in the art, e.g., the readings could be performed automatically, or the guide 32 could be scanned by input 37, or guide data could be programmed into the computer algorithm, etc. It is therefore to be understood that, within the scope of the appended claims, the invention may be practiced otherwise than as specifically described.

I claim:

1. A color matching system for determining a colorant formulation comprising:
   means for analyzing a color sample to determine its color spectrum;
   means for determining from said spectrum a color match formulation from a set of predetermined colorants;
   means for determining a quality index related to the quality of the match of said formulation; and
   means for modifying said color sample a plurality of predetermined measured amounts.

2. A color matching system according to claim 1 wherein said means for modifying said color sample includes a partially transparent overlay superimposed over said color sample.

3. A color matching system according to claim 2 wherein said partially transparent overlay includes a plurality of areas of varying degrees of color modifying sections.

4. A color matching system according to claim 3 wherein said color modifying sections include halftone sections.

5. A color predictability guide for use in a color matching system comprising:
   a color sample;
   a partially transparent sheet; and
   a plurality of sections on said sheet having means for modifying said color sample, wherein said means for modifying includes halftone sections on said sheet.

6. A color predictability guide for use in a color matching system comprising:
   a color sample;
   a partially transparent sheet;
   a plurality of sections on said sheet having means for modifying said color sample, wherein said means for modifying includes halftone sections on said sheet; and
   said halftone sections having a plurality of predetermined varying degrees of tone.

7. A color predictability guide for use in a color matching system comprising:
   a color sample;
   a partially transparent sheet;
   a plurality of sections on said sheet having means for modifying sid color sample, wherein said means for modifying includes halftone sections on said sheet; and
   said halftone sections having a plurality of predetermined varying degrees of tone, and said halftone sections are aligned in rows and columns of progressively greater halftones.

8. A color matching method for determining a colorant formulation from a predetermined set of colorants comprising:
   (a) analyzing a color sample to determine its spectrum;
   (b) generating a colorant formulation to produce a color match based on said last-mentioned spectrum;
   (c) generating a quality index related to said formulation;
   (d) modifying said color sample a predetermined amount to produce a modified sample;
   (e) analyzing said modified sample to determine its spectrum; and
   (f) repeating steps (b)-(e) and modifying said color sample in step (d) a different amount for each cycle, whereby the formulation having the best quality index may be determined and the corresponding modified color sample may be viewed.

9. A method according to claim 8 wherein step (d) includes placing a partially transparent overlay over said sample.

10. A method according to claim 9 wherein said partially transparent overlay includes a plurality of areas of varying degrees of modification.

11. A method according to claim 9 wherein said overlay includes a plurality of halftone sections.

* * * * *